United States Patent [19]
Dykstra et al.

[11] Patent Number: 5,611,052
[45] Date of Patent: Mar. 11, 1997

[54] LENDER DIRECT CREDIT EVALUATION AND LOAN PROCESSING SYSTEM

[75] Inventors: Diana R. Dykstra, Herald; Patricia M. Wade, Meadow Vista, both of Calif.

[73] Assignee: The Golden 1 Credit Union, Sacramento, Calif.

[21] Appl. No.: 146,692

[22] Filed: Nov. 1, 1993

[51] Int. Cl.$^6$ .............................. G06F 17/60; G06G 7/52
[52] U.S. Cl. .............................................. 395/238; 395/235
[58] Field of Search ..................................... 364/401, 408, 364/406, 401 R; 235/375, 379, 380, 382

[56] References Cited

U.S. PATENT DOCUMENTS

| | | | |
|---|---|---|---|
| 4,642,768 | 2/1987 | Roberts | 364/408 |
| 4,683,536 | 7/1987 | Yamamoto | 364/408 |
| 4,722,055 | 1/1988 | Roberts | 364/408 |
| 4,736,294 | 4/1988 | Gill et al. | 364/408 |
| 4,752,877 | 6/1988 | Roberts et al. | 364/408 |
| 4,774,664 | 9/1988 | Campbell et al. | 364/408 |
| 5,025,373 | 6/1991 | Keyser, Jr. | 364/408 |
| 5,126,936 | 6/1992 | Champion et al. | 364/408 |
| 5,198,642 | 3/1993 | Deniger | 235/375 |
| 5,202,825 | 4/1993 | Miller et al. | 364/401 |
| 5,239,462 | 8/1993 | Jones et al. | 364/408 |
| 5,262,941 | 11/1993 | Saladin et al. | 364/406 |
| 5,274,547 | 12/1993 | Zoffel et al. | 364/408 |

*Primary Examiner*—Gail O. Hayes
*Assistant Examiner*—Stephen R. Tkacs
*Attorney, Agent, or Firm*—John P. O'Banion

[57] ABSTRACT

An apparatus and method for automatic credit evaluation and loan processing is disclosed. The apparatus includes a central processing unit which has capabilities for communicating with off-site remote access terminals. The central processing unit also includes facsimile transmission capabilities as well as capabilities for communicating with credit bureau computers. Mass storage capabilities are included for storing program modules executable on the central processing unit and for maintaining databases. Program modules are provided for remote access security, credit bureau information processing, credit scoring, message display, and facsimile generation. In operation, the central processing unit is accessed from a remote terminal, loan application information is entered into the remote terminal, credit bureau information is accessed by the apparatus, credit scoring is performed, and a loan application is approved or declined. All steps, except for the entering of loan application information into the remote terminal, are fully automated, require no intermediate human intervention, and no intermediate handling of paper records. Application status is provided to the user via a visual display on the remote access terminal and hard copy confirmation to the user and lender via facsimile transmission.

16 Claims, 7 Drawing Sheets

LENDER DIRECT CREDIT EVALUATION AND LOAN PROCESSING SYSTEM

BACKGROUND OF THE INVENTION

1. Field of the Invention

This invention pertains to computerized information management and processing systems generally, and more particularly to an apparatus and method for automatically evaluating the credit of a potential borrower and processing the potential borrower's loan application.

2. Description of the Background Art

When a potential borrower desires to obtain a loan for financing a home, vehicle, boat, jewelry or other substantial purchase, the potential borrower is commonly required to complete one or more various forms constituting a loan application. The information entered on the forms can be voluminous, and can include financial information such as account records, account balances, loan balances or the like, which is of a confidential nature. The information is then either manually evaluated or evaluated using the assistance of a computer-based system. In the process, the information may be reviewed by several people and presented in various written or printed formats. As a result, confidentiality becomes a problem as dissemination of the information increases and, as more people are involved in the evaluation process, the likelihood of human error increases. Such human error can lead to the information being misread or misinterpreted, incorrect information being input into a computer, and even the information be mixed up with another borrower's file. In addition, the evaluation process can be slow and tedious.

In an effort to reduce potential errors and expedite evaluation of the loan applications, automated loan evaluation systems have been developed. For example, U.S. Pat. No. 5,239,462 issued to Jones et al. on Aug. 24, 1993, discloses a method and apparatus for automatically determining the approval status of a potential borrower. This system, however, still requires use of a prepared loan application, in the form of an encoded input sheet. Further, the system relies on facsimile transmission of the encoded input sheet, which is susceptible to scanning errors as well as data transmission errors. In addition, the input sheet must be mechanically scanned a second time after being sent by facsimile transmission. U.S. Pat. No. 4,736,294 issued to Gill et al. on Apr. 5, 1988, discloses data processing methods and apparatus for managing vehicle financing. Again, this system requires use of an application form. In addition, the system is not fully automated, and provides hard copy printouts for use in the evaluation process.

Further, neither system provides the capability to select a particular lender, or perform a complete evaluation and approval of the loan with confirmation being forwarded directly to the lender as well as to the potential borrower. Nor does either system provide for the use of custom scoring models but, instead, uses scores provided by a credit bureau.

Therefore, a need exists for a fully integrated credit evaluation and loan processing system which provides access to multiple lenders, and which provides for complete evaluation and approval of a loan. The present invention satisfies such need, as well as others, and overcomes the deficiencies in systems heretofore developed.

SUMMARY OF THE INVENTION

The present invention generally comprises a fully automated credit evaluation and loan processing apparatus and method. The method is implemented using a central processing unit which receives input signals over various communications channels, and which in turn are linked via modems to peripheral input devices such as point of purchase terminals, microcomputers or the like. Output signals from the system are directed over communications channels via modems to peripheral output devices such as point of purchase terminals, facsimile machines, microcomputers or the like. The central processing unit also includes the capability to communicate bidirectionally with other computers, as well as to access databases. Access to the central processing unit is gained using a point of purchase terminal, microcomputer or the like. Telephone lines are used as the communications link, and the central processing unit includes means whereby access can be denied. In order to gain access, the central processing unit is dialed from a remote terminal, an identification code is requested by the central processing unit, the communications link is broken, and the central processing unit dials the user back. The identification code is again requested and, if it is a valid code, access is permitted. At that point, the user must enter a password for access to the central processing unit.

Once access to the central processing unit is gained, the user selects a desired lending institution and enters the loan application information. The central processing unit then accesses the credit bureau which has been preselected by the chosen lending institution and obtains a credit report for the borrower. Next, the central processing unit accesses the credit scoring model which the particular lender has preselected. A first stage scoring is then made based on the loan application information. Next, a second stage scoring is made based on the credit report. The two scores are then numerically totalled, and a scoring matrix for the particular lender is accessed. A loan value is assigned to the score, and the score is compared to a cut-off level set by the particular lender. Scores falling below the cut-off level indicate a loan which has been declined. Otherwise, a loan is approved.

An object of the invention is to provide a computer integrated credit evaluation and loan processing system.

Another object of the invention is to provide a fully automated computer-based system for evaluating credit and processing loan applications.

Another object of the invention is to provide a computer-based system for approving loan applications without the need for pre-approval or pre-qualification.

Another object of the invention is to provide an apparatus which improves accuracy and speed in credit evaluation and loan processing.

Another object of the invention is to provide an apparatus which can reduce the amount of human handling of information.

Another object of the invention is to simplify and minimize manual work related to credit evaluation and loan processing.

Another object of the invention is to provide for use of empirical scoring models for evaluating credit.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only.

DESCRIPTION OF THE PREFERRED EMBODIMENTS

Figure 1:
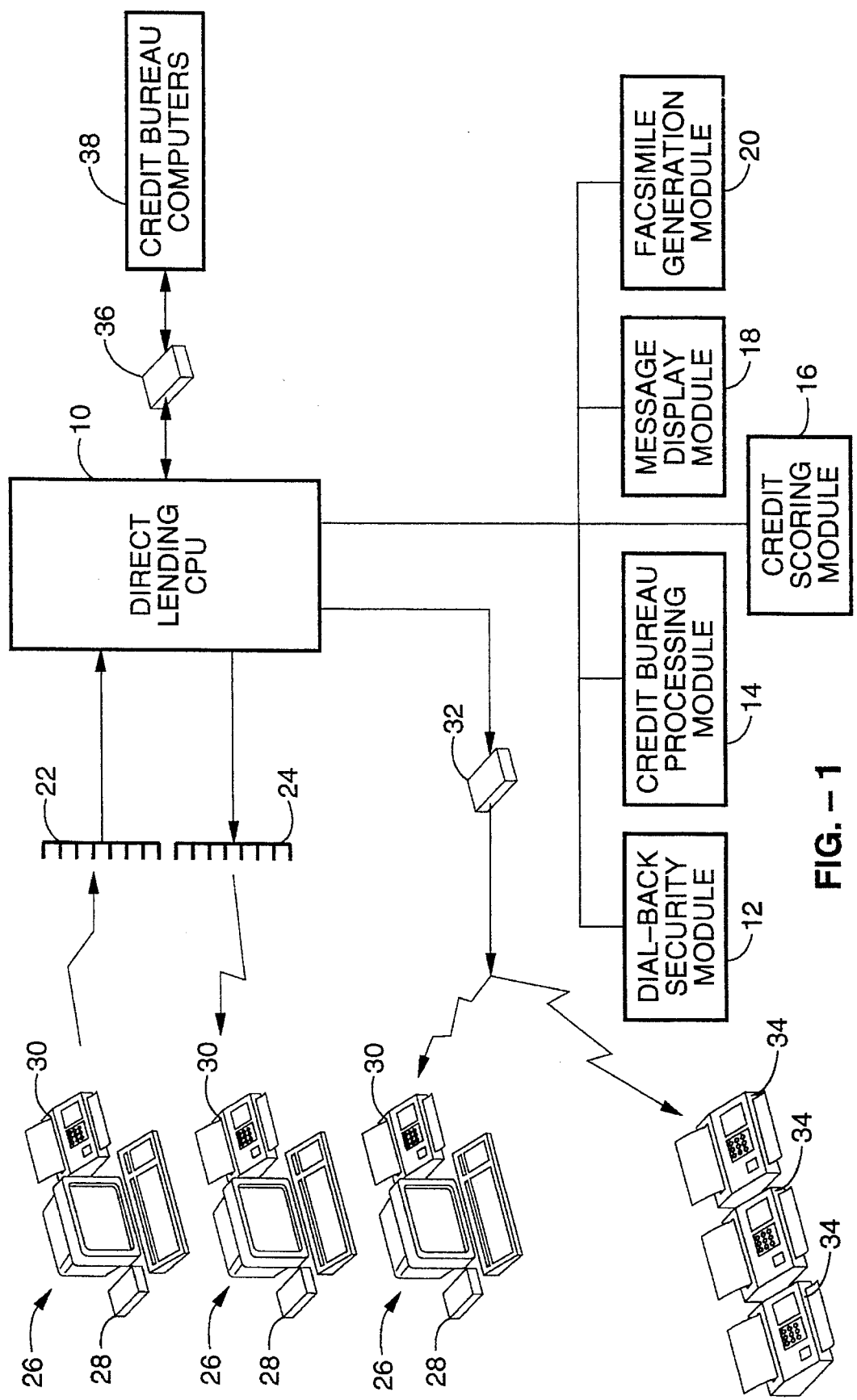
FIG. 1 is a functional block diagram of the apparatus of the present invention.

Referring more specifically to the drawings, for illustrative purposes the present invention is embodied in the system configuration generally shown in FIG. 1 and in the method steps shown generally in FIG. 2A through FIG. 2F. It will be appreciated that the system and method of operation may vary as to the details of its configuration and operation without departing from the basic concepts as disclosed herein.

Referring to FIG. 1, the invention generally comprises an automated credit evaluation and loan processing apparatus as shown. The invention includes a plurality of program modules executable on a programmed data processor shown as direct lending central processing unit 10. Central processing unit 10 is typically a computer such as a VAX or the like running with a hardware compatible operating system. Mass storage for the system generally comprises hard disk drives. Residing on those hard disk drives, and central to operation of the system, are various data files and program modules. These files are integrated and interact with each other through central processing unit 10. The program modules include a dial back security module 12, a credit bureau processing module 14, a credit scoring module 16, a message display module 18, and a facsimile generation module 20.

Central processing unit 10 is connected to, and interacts with, selected peripheral input and output devices. For user access, one or more incoming modems 22 and outgoing modems 24 are provided. Alternatively, bidirectional modems could be used. Said modems provide data communication capabilities over one or more telephone lines to point of purchase terminals 26 which serve as remote access terminals. Point of purchase terminals 26 could be dumb terminals, smart terminals, microcomputers or the like, having a keyboard, display, or other user input/output devices. Modems 28 are also provided at point of purchase terminals 26 to complete the data communications link. Point of purchase facsimile receiving devices 30 are also provided for printing report images transmitted from the central processing unit 10. Alternatively, point of purchase terminals 26 could include facsimile (fax) modems and printers.

Security is provided between point of purchase terminals 26 and central processing unit 10 by means of dial back security module 12 which prevents unauthorized access. Dial back security module 12 is a software module resident in central processing unit 10 which accesses communications ports on central processing unit 10 which are linked to incoming modems 22 and outgoing modems 24. Also coupled to central processing unit 10 are one or more facsimile modems 32 for transmitting report images to one or more lender facsimile receiving devices 34 over one or more telephone lines. A credit bureau link modem 36 is connected to central processing unit for communications between it and one or more credit bureau computers 38.

Figure 2A:
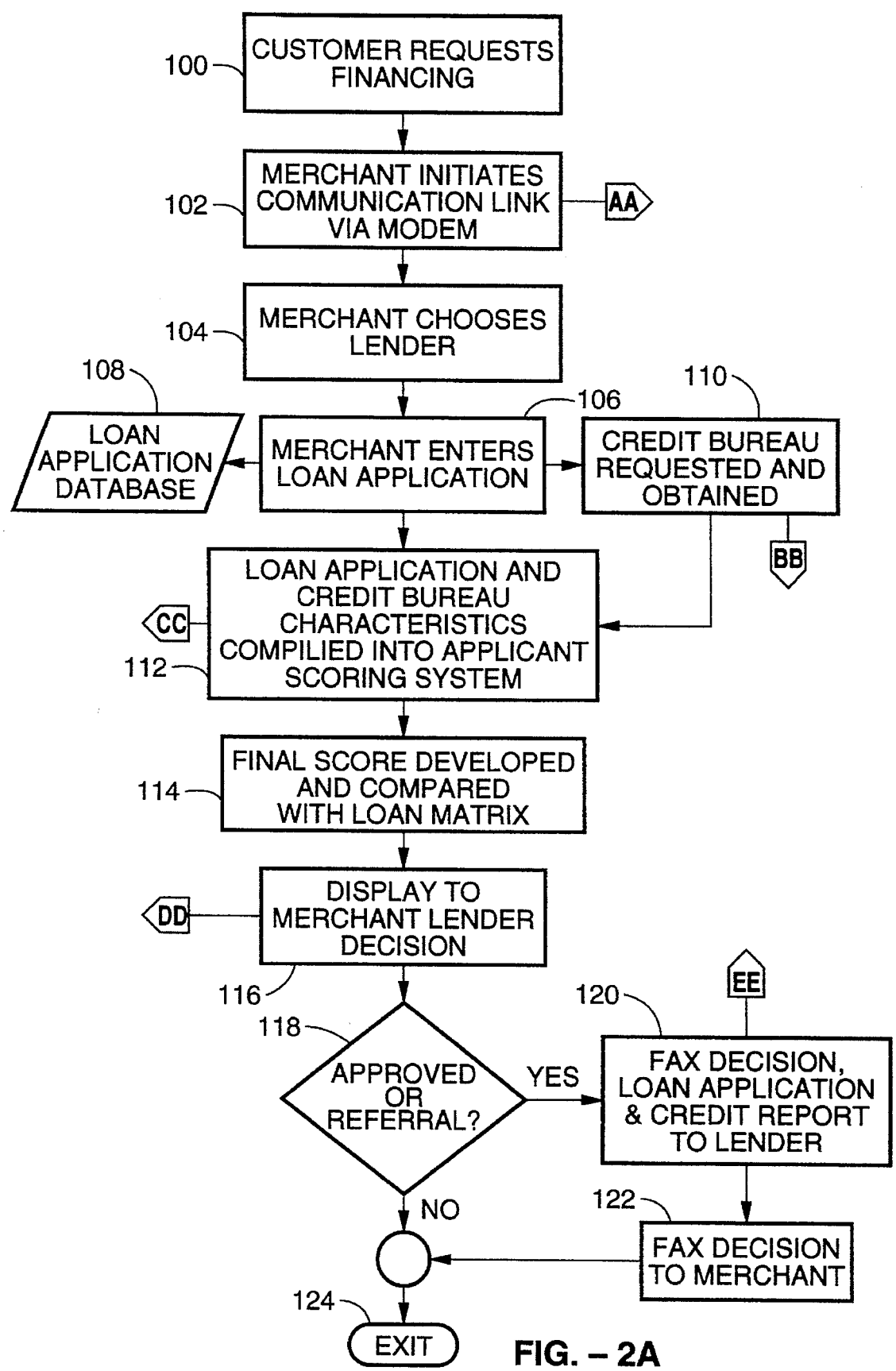
FIG. 2A is a functional flow diagram showing the overall method of operation of the apparatus shown in FIG. 1.

Referring also to FIG. 2A, the overall system operation can be seen. At step 100 a customer decides to make a financed purchase and requests a loan in a particular amount. The user, who is typically a merchant such as a mortgage lender, car dealer, store operator or the like, accesses a point of purchase terminal 26 and, at step 102, initiates communications with central processing unit 10. Once communications is established, the merchant chooses a particular lender at step 104. The choice of lender could be based on the request of the potential borrower, or a lender with whom the merchant regularly conducts business. Next, at step 106, the merchant enters the potential borrower's loan application information into the point of purchase terminal 26. The merchant would normally view a video display attached to the point of purchase terminal 26 and read a series of questions or data fields on the display. The merchant then enters any merchant specific information requested into the point of purchase terminal 26 by means of an attached keyboard or other input device. Information pertaining to the potential borrower, such as name, address, social security number, employer, income and the like, is then directly entered into the appropriate field on the display. Such information would be the equivalent of a written loan application for evaluation. Here, however, the intermediate steps of first filling out a written application and subsequently transferring the information into point of purchase terminal 26 are eliminated. Information which is entered at this step is stored in a loan application database 108 for later retrieval and use.

At step 110, a particular credit bureau is selected for checking the potential borrower's credit. The credit bureau could be TRW, Equifax, Trans Union, or any other credit bureau to which access has been previously authorized. It is not anticipated that borrower or merchant selection of a particular credit bureau would be provided; instead, the credit bureau would be preselected by the chosen lender and, therefore, automatically selected when the lender is selected by the potential borrower. At this step, credit information is obtained for the potential borrower. At step 112, the loan application information and credit bureau information regarding the potential borrower is compiled into a scoring model. This can be a generic model or, preferably, a custom model developed by or for the particular lender. By using a custom model, the scoring can be based on empirical data for that particular lender. By using a custom or generic model, final approval can be determined without the need for the lender to review a pre-approval or pre-qualification. At step 114, a final score is developed and compared with a loan approval matrix preselected by the lender. In addition, a determination is made as to approval of the loan, whether referral to the lender is necessary for further consideration, whether the loan is denied, or whether an error has been detected. At step 116, the loan decision status is displayed to the merchant on the video display attached to point of purchase terminal 26. At step 118, the loan decision status is checked and, if the loan is approved or referred, the process continues at step 120 where the loan application, approval or referral status, and credit report are sent to the lender for receipt on a lender facsimile receiving device 34. At step 122, the decision is then sent to the merchant for receipt on a point of purchase facsimile receiving device 30. The potential borrower can then take a copy of the facsimile approval to the lender for verification and sign the papers for the loan, or the lender may choose to purchase the financing contract for the borrower directly from the merchant. The process is then completed and terminates at step 124. If the loan is denied, steps 120 and 122 are bypassed and the process terminates at step 124.

Figure 2B:
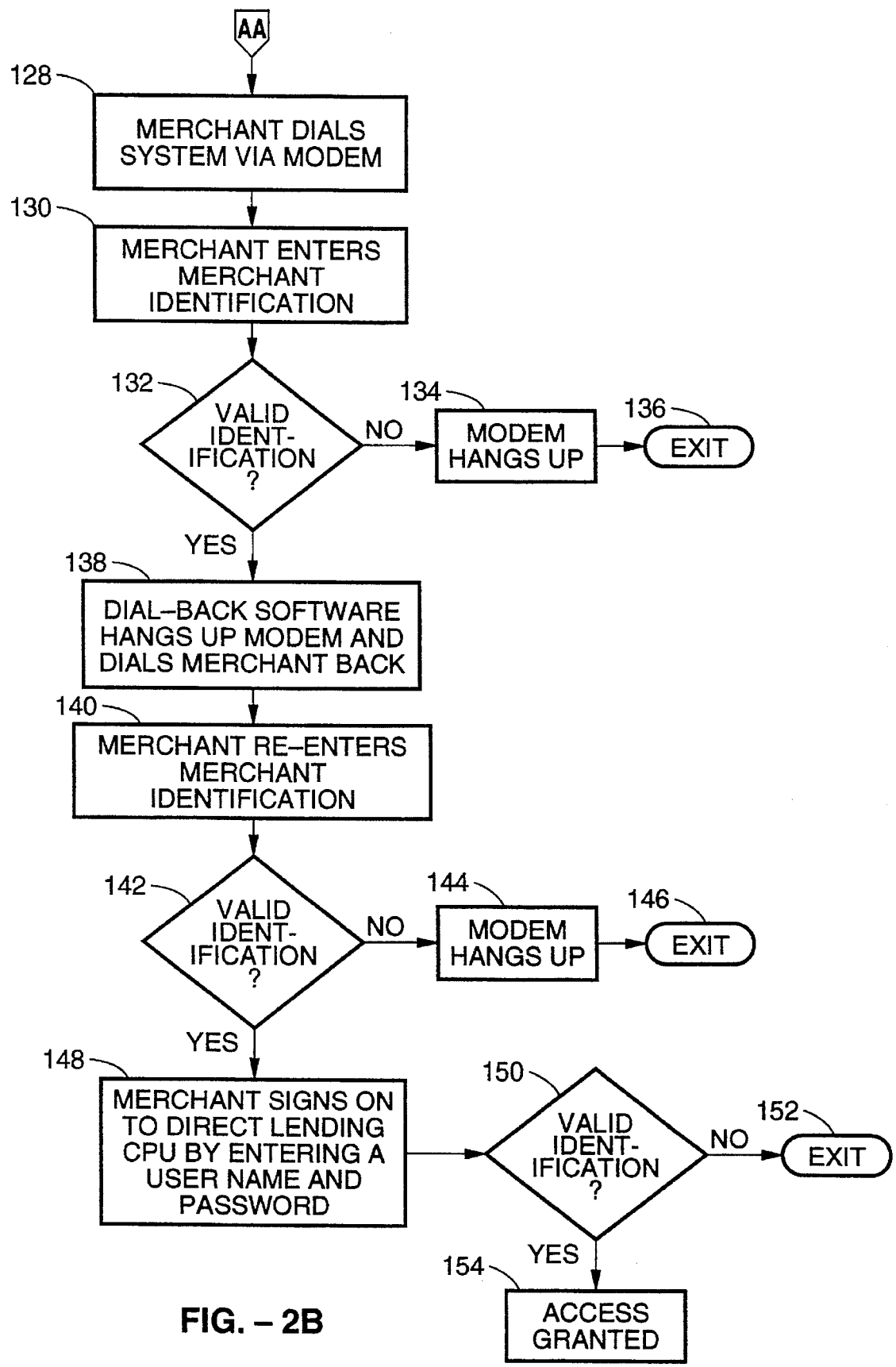
FIG. 2B is a functional flow diagram of the dial back security module of the present invention.
Figure 2C:
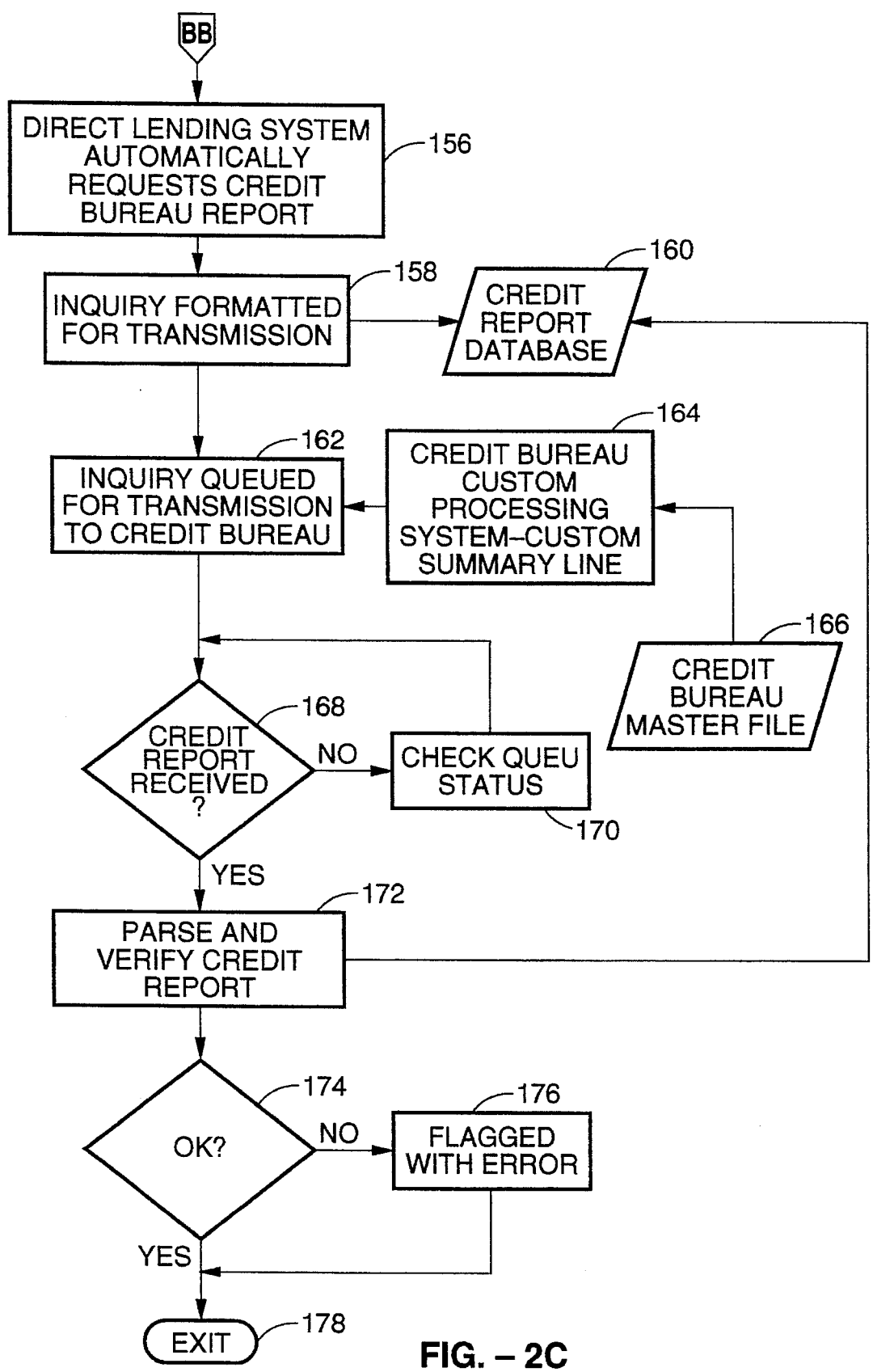
FIG. 2C is a functional flow diagram of the credit bureau processing module of the present invention.

Referring also to FIG. 2B, operation of the dial back security module 12 can be seen. As indicated previously, at step 102 the merchant initiates communication with the central processing unit 10. In order to do so, the merchant must first cause the point of purchase terminal 26 to dial central processing unit 10 at step 128. At step 130, the merchant is prompted to enter an identification code. The code is entered and, at step 132, is compared by central processing unit 10 with a database of valid identification codes. If the code is invalid, central processing unit 10 terminates the communications link at step 134 and operation is discontinued at step 136. If the identification code is valid, at step 138 central processing unit 10 terminates the communications link and dials back the merchant. At step 140, the merchant is again prompted to enter an identification code. The code is entered and, at step 142, the code is compared with the database of valid identification codes. If the code is invalid, central processing unit 10 terminates the communications link at step 144 and operation is discontinued at step 146. If the identification code is valid, at step 148 access is opened and the merchant is prompted for a user name and password. The user name and password are entered and, at step 150, compared with those in a database. If invalid, operation is discontinued at step 152. Otherwise, full access to central processing unit 10 is granted at step 154 and operation continues at step 104 (FIG. 2A).

Referring again to FIG. 2A, as shown in step 110 central processing unit 10 accesses and obtains credit bureau information such as a credit report. This is accomplished in the following manner by the credit bureau processing module shown in FIG. 2C. At step 156, central processing unit 10 automatically enters into a credit bureau information request mode and prepares a request for a credit report. At step 158, the credit report inquiry is formatted for transmission to a credit bureau computer 38. The formatted credit inquiry is then stored in a credit report database 160 for later use for audit and statistical purposes. At step 162, the formatted inquiry information is queued for transmission to the credit bureau computer 38. Next, the inquiry is transmitted and a credit report is obtained from the credit bureau master file 166. The credit report may be used directly, or optionally pre-processed at step 164. Here, the credit report may be evaluated for items of particular interest, such as the number of 90-day overdue accounts for the potential borrower. This particular information is appended to the credit report as a custom summary line for later use in the process.

At step 168, central processing unit 10 determines if the complete credit report has been received. If not, the queue status is checked at step 170 and the steps are repeated until the report has been received. Once received, the stream of data constituting the credit report is parsed, verified for completeness, and preformatted at step 172. The preformatted data, as well as a copy of the original inquiry data, is stored in credit report database 160 for later use. If the data stream is verified as complete at step 174, the module ends at step 178 and the process continues at step 112 (FIG. 2A). Otherwise, the data is first flagged as having an error at step 176.

Figure 2D:
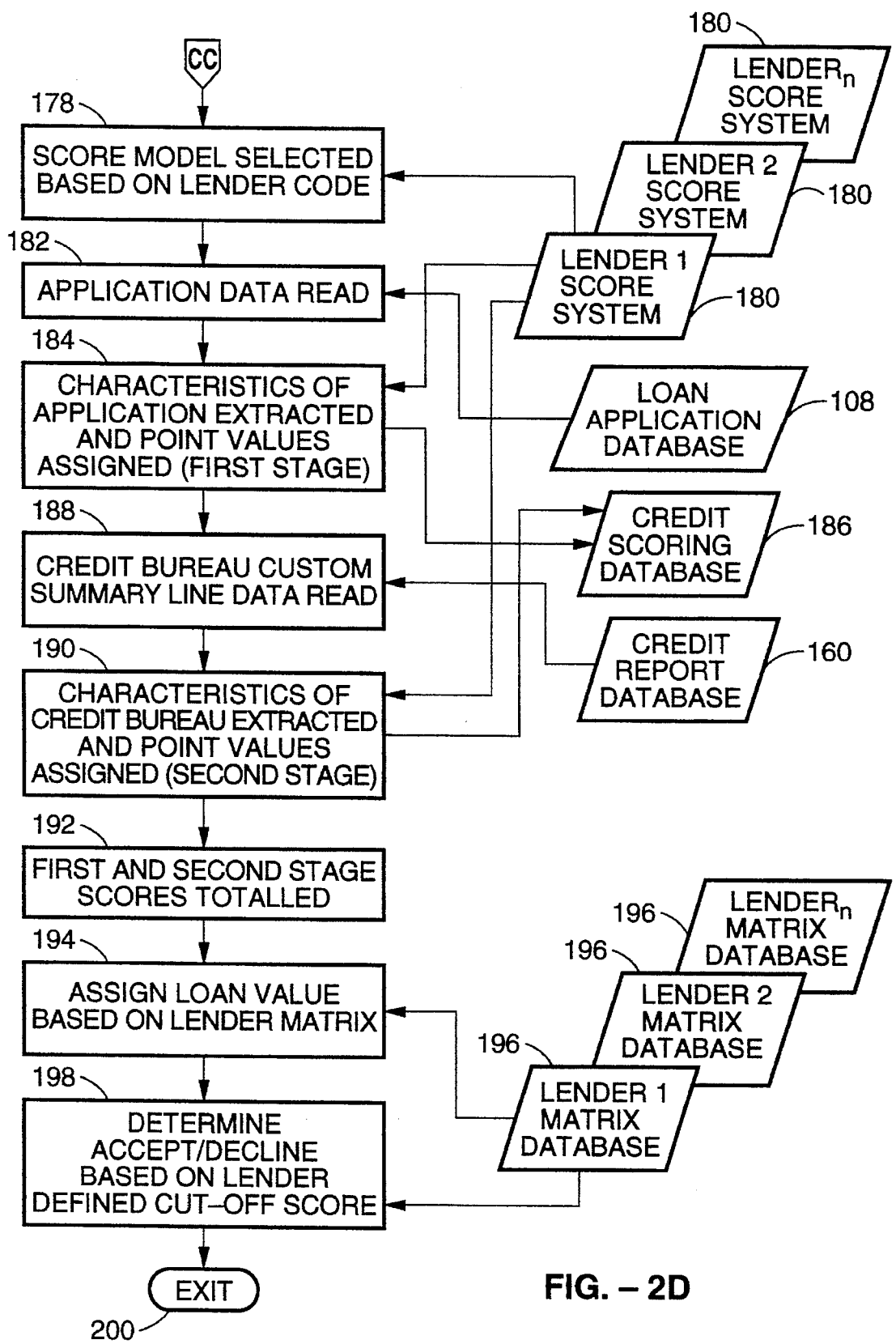
FIG. 2D is a functional flow diagram of the credit scoring module of the present invention.

Referring also to FIG. 2D, before a decision can be given to the merchant at step 116 (FIG. 2A), the credit scoring module must be invoked. This module corresponds to steps 112 and 114 shown in FIG. 2A. At step 178, central processing unit 10 identifies which of several lender specific score models 180 will be used in the evaluation process. Each score model 180 will have a particular code which will correspond to a lender code, and could be a generic or custom model. As explained earlier, a particular lender may have developed a custom model based on its own empirical data. Once the score model code is determined, the application data is read at step 182 from the loan application database 108. At step 184, the appropriate score model 180 is accessed, and a first stage scoring takes place. In the first stage evaluation, the scoring is based on only the application data as it fits within the score model. The information is scored, and a numerical value is assigned. Next, the information used for scoring and the resultant score is stored in a credit scoring database 186 for later use as historical data for custom scoring models as well as for other purposes. At step 188, the custom summary line provided with the credit report is input from the credit report database 160. Using the score model 180 and the credit report information, a second stage scoring takes place at step 190 and a numerical value is assigned. Then, at step 192, the two numerical values from the first and second stage scorings are added together to yield a single, total score. At step 194, a lender matrix database 196 is accessed and a loan value is assigned based on the score. Here, the potential borrower's income and score are compared to the loan matrix which is predetermined for a particular lender and used to determine the amount of the loan for which the potential borrower is qualified. At step 198, central processing unit 10 determines whether, notwithstanding the qualified loan amount previously determined, the score is above or below a threshold in the lender's loan matrix. If the score is below the threshold, the loan will be flagged as denied. Otherwise, the loan is flagged as approved. The module then completes its operation at step 200 and processing continues at step 116 (FIG. 2A).

Figure 2E:
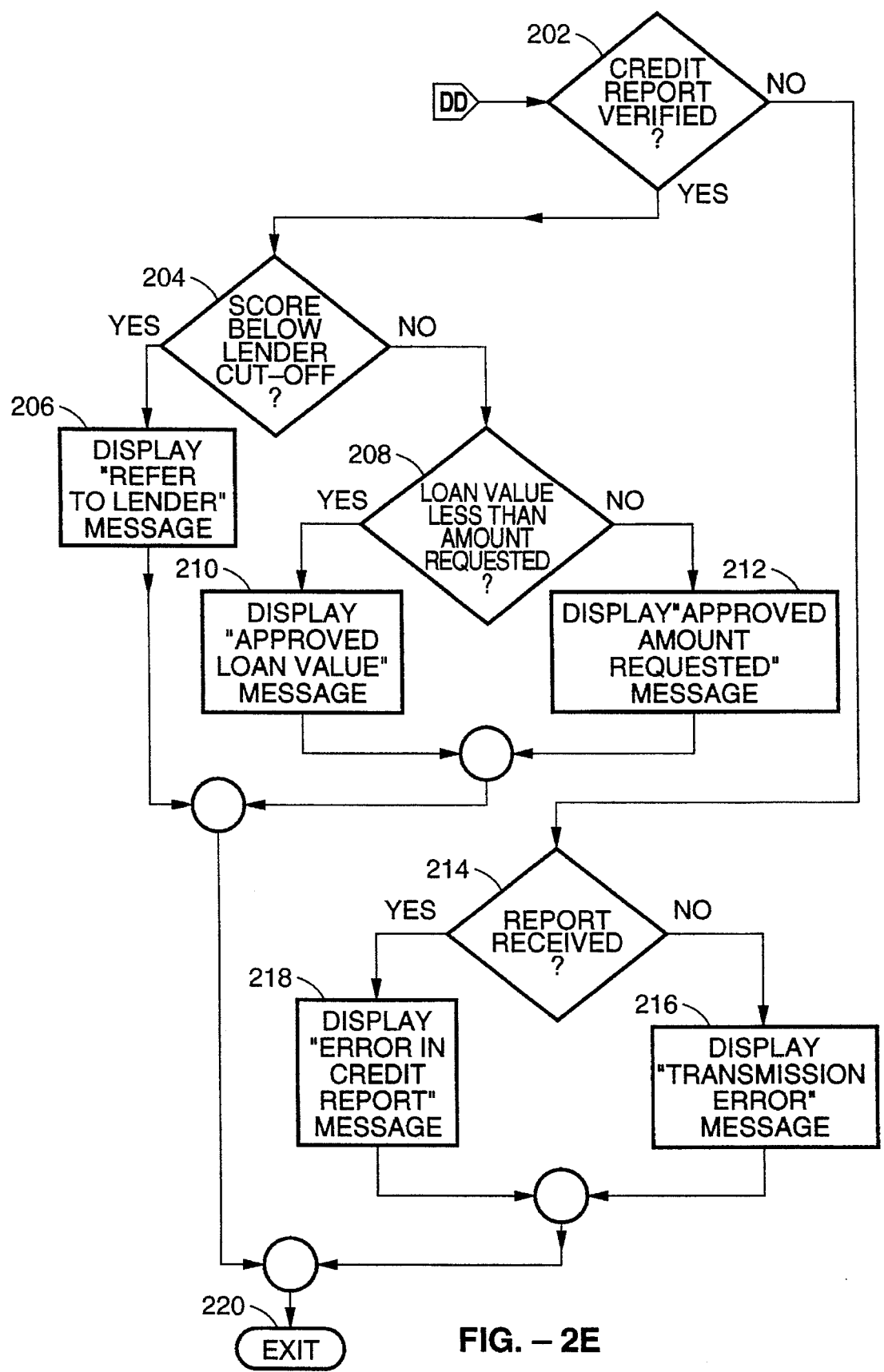
FIG. 2E is a functional flow diagram of the message display module of the present invention.

Referring now to FIG. 2E, operation of the message display module is shown. This module corresponds to step 116 in FIG. 2A. At step 202, central processing unit 10 determines if a complete credit report is present in the system. If one is not present, then at step 214, a determination is made as to whether the credit report was received at all. If a credit report was not received, at step 216 a transmission error message is displayed on point of purchase terminal 26. If a credit report was received, then at step 218 a message indicating an error in the credit report is displayed. After display of either error message, the module terminates at step 220. From step 220, processing continues at step 118 (FIG. 2A).

If the credit report is verified as complete, at step 204 a determination is made as to whether the total score from step 192 (FIG. 2D) was flagged at step 198 (FIG. 2D) as being below the lender's cut-off threshold. If the score was so flagged, at step 206 a message is displayed indicating that the application is being referred to the lender for further consideration and the module terminates at step 220. If the score was not so flagged, then at step 208 a determination is made as to whether the loan amount approved is less than the loan amount requested by the potential borrower. If the loan amount approved is less than the amount requested, at step 210 a message is displayed indicating the amount of the loan for which approval has been obtained. The module then terminates at step 220. If the loan amount approved is greater than the amount requested, then at step 212 a message is displayed indicating that approval has been obtained for the loan amount requested and the module then terminates at step 220.

Figure 2F:
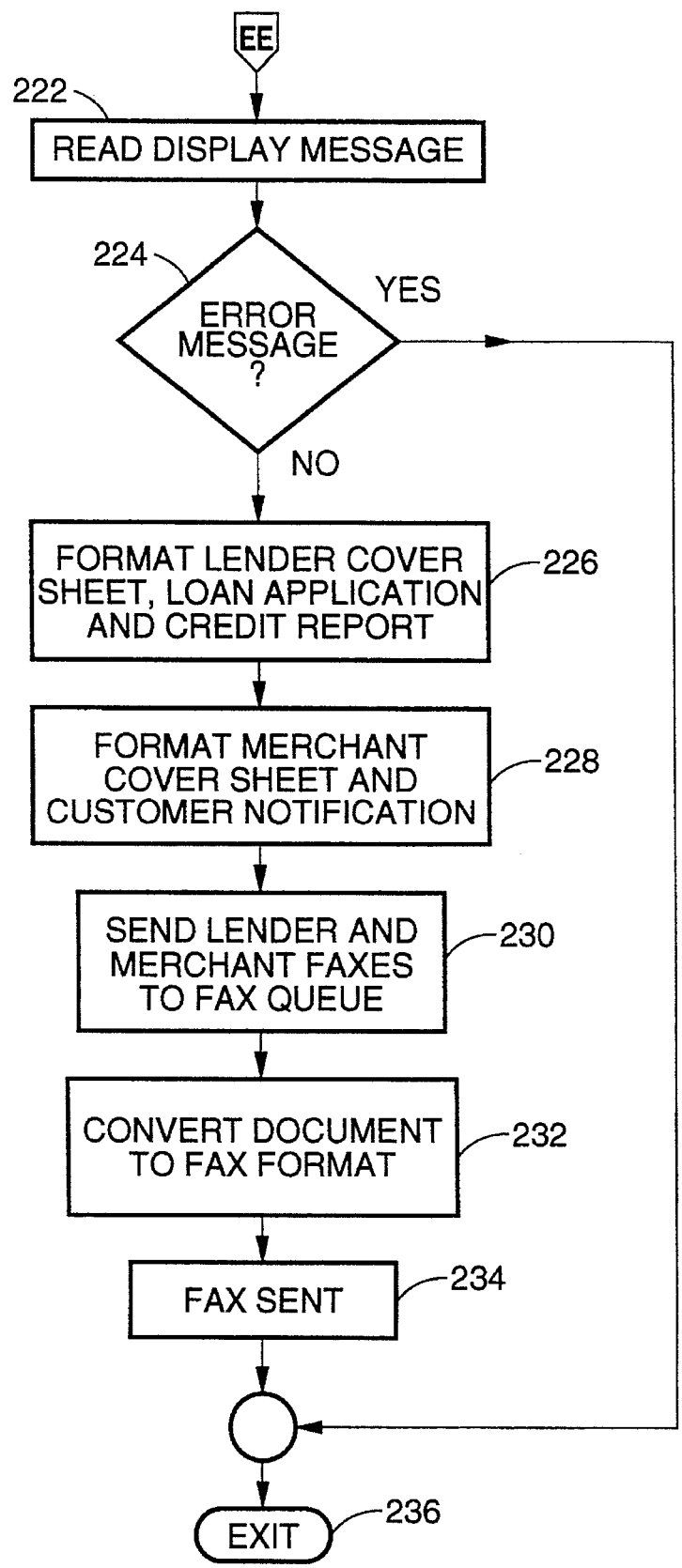
FIG. 2F is a functional flow diagram of the facsimile generation module of the present invention.

Lastly, referring also to FIG. 2F, the facsimile generation module which corresponds to steps 120 and 122 of FIG. 2A is shown. At step 222, central processing unit 10 determines the character of the message previously displayed. At step 224, central processing system 10 determines if an error message was displayed. If so, the module terminates at step 236 and operation of the entire system ends at step 124 (FIG. 2A). Otherwise, a lender report which includes a cover sheet, the loan application, and the credit report are formatted for facsimile transmission at step 226. The lender cover sheet can contain information such as the name, address, contact person, and telephone number for the merchant, the potential borrower's name and account number, the amount of the loan requested, the amount approved, and the date. At step 228, the merchant report which includes a cover sheet and customer notification are formatted for facsimile transmission. The merchant's cover sheet typically includes the same information as on the lender's cover sheet, plus the name, address and telephone number of the lender. The customer notification is typically a separate sheet which serves as verification to the potential borrower of the loan approval. At step 230, the formatted fax data is sent to a fax queue. Next, the data is data is converted to a fax format at step 232 and transmitted at step 234. The lender's fax is sent to a lenders facsimile receiving device 34, while the merchant's and potential borrower's fax is sent to a point of purchase facsimile receiving device 30. The module then terminates at step 236 and the operation of the system terminates at step 124 (FIG. 2A). From there, the potential borrower can take his or her copy of the verification of the loan approval to the lender, sign the papers, and obtain the loan money, or the lender may choose to purchase the financing contract for the borrower directly from the merchant. The loan will have been completely approved, and not be subject to further lender consideration as would be the case with a pre-approval or pre-qualification.

Accordingly, it will be seen that this invention can be used as an efficient and effective automated credit evaluation and loan processing system, which eliminates human handling and processing of financial information, credit scoring, and loan approval. Although the description above contains many specificities, these should not be construed as limiting the scope of the invention but as merely providing illustrations of some of the presently preferred embodiments of this invention. Thus the scope of this invention should also be determined by the appended claims and their legal equivalents.

We claim:

1. A computer based credit evaluation and loan application processing apparatus, comprising:

(a) a central processing unit;

(b) remote access terminal means for accessing said central processing unit, for entering loan application information pertaining to a potential borrower, for selecting a lender, for transmitting said loan application information to said central processing unit, and for receiving a loan approval status pertaining to said potential borrower from said central processing unit;

(c) credit bureau processing module means associated with said central processing unit for transmitting an information request to a credit bureau associated with said selected lender, and for receiving a credit report from said credit bureau pertaining to said potential borrower;

(d) credit scoring module means associated with said central processing unit for selecting a credit scoring model associated with said selected lender, for inputting loan application information into said credit scoring model and determining a first stage numerical credit score, for inputting credit report information into said credit scoring model and determining a second stage numerical score, and for determining a loan approval status for said potential borrower by comparing said loan application information and the numerical sum of said first and second stage credit scores with a loan matrix associated with said lender; and, (e) means associated with said central processing unit for generating a lender port based on said loan approval status and transmitting said lender report to a remote receiving unit for displaying said lender report.

2. An apparatus as recited in claim 1, further comprising message display module means associated with said central processing unit for displaying said loan approval status on said remote access terminal means.

3. An apparatus as recited in claim 1, further comprising first facsimile receiving means associated with said remote access terminal means for receiving an image of a merchant report containing said loan approval status from said central processing unit.

4. An apparatus as recited in claim 3, further comprising first facsimile transmitting means associated with said central processing unit for transmitting an image of said merchant report to said first facsimile receiving means.

5. An apparatus as recited in claim 3, further comprising second facsimile receiving means associated with a lender for receiving an image of a lender report containing said loan approval status from said central processing unit.

6. An apparatus as recited in claim 5, further comprising second facsimile transmitting means associated with said central processing unit for transmitting an image of said lender report to said second facsimile receiving means.

7. An apparatus as recited in claim 6, further comprising facsimile generation module means associated with said central processing unit for generating and sending said merchant report and said lender report.

8. An apparatus as recited in claim 1, further comprising dial back security module means associated with said central processing unit for preventing unauthorized access to said central processing unit.

9. A computer based apparatus for automatic evaluation of credit and determination of loan approval for a potential borrower, comprising:

(a) a central processing unit;

(b) remote access terminal means for entering loan application information pertaining to a potential borrower and selecting a lender for loan approval;

(c) first data communication means for accessing said central processing unit from said remote access terminal means;

(d) second data communication means for obtaining a credit report for said potential borrower;

(e) credit scoring module means associated with said central processing unit for selecting a credit scoring model associated with said selected lender, for inputting loan application information into said credit scoring model and determining a first stage numerical credit score, for inputting credit report information into said credit scoring model and determining a second stage numerical score, and for determining a loan approval status for said potential borrower by comparing said loan application information and the numerical sum of said first and second stage credit scores with a loan matrix associated with said lender; and, (f) means associated with said central processing unit for generating a lender report based on said loan approval status and transmitting said lender report to a remote receiving unit for displaying said lender report.

10. An apparatus as recited in claim 9, further comprising:

(a) means for transmitting by facsimile an image of a merchant report containing said loan approval status; and (b) means for transmitting by facsimile an image of a lender report containing said loan approval status.

11. A method of using the apparatus recited in claim 9, comprising the steps of:

(a) establishing telecommunications with said central processing unit from said remote access terminal means;

(b) entering an identification code into said remote access terminal means;

(c) obtaining a first validation of said identification code from said central processing unit;

(d) said central processing unit terminating said telecommunications upon validation of said identification code;

(e) said central processing unit reestablishing telecommunications with said remote access terminal means;

(f) reentering said identification code into said remote access terminal means; and (g) obtaining a second validation of said identification code from said central processing unit.

12. A computerized apparatus for automatic evaluation of credit and determination of loan approval for a potential borrower, comprising:

(a) a central processing unit;

(b) remote access terminal means for entering loan application information pertaining to a potential borrower and selecting a lender for loan approval;

(c) first data communication means for accessing said central processing unit from said remote access terminal means;

(d) credit bureau processing module means associated with said central processing unit for automatically transmitting an information request to a credit bureau associated with said selected lender, and for automatically receiving a credit report from said credit bureau pertaining to said potential borrower;

(e) credit scoring module means associated with said central processing unit for selecting a credit scoring model associated with said selected lender, for inputting loan application information into said credit scoring model and determining a first stage numerical credit score, for inputting credit report information into said credit scoring model and determining a second stage numerical credit score, and for determining a loan approval status for said potential borrower by comparing said loan application information and the numerical sum of said first and second stage credit scores with a loan matrix associated with said lender; and, (f) means associated with said central processing unit for generating a lender report based on said loan approval status and transmitting said lender report to a remote receiving unit for displaying said lender report.

13. An apparatus as recited in claim 12, further comprising means for automatically notifying the potential borrower and the selected lender of said loan approval status.

14. An apparatus as recited in claim 12, further comprising means for automatically transmitting by facsimile an image of a merchant report containing said loan approval status.

15. An apparatus as recited in claim 12, further comprising means for automatically transmitting by facsimile an image of a lender report containing said loan approval status.

16. A method of using the apparatus recited in claim 12, comprising the steps of:

(a) establishing telecommunications with said central processing unit from said remote access terminal means;

(b) entering an identification code into said remote access terminal means;

(c) obtaining a first validation of said identification code from said central processing unit;

(d) said central processing unit terminating said telecommunications upon validation of said identification code;

(e) said central processing unit reestablishing telecommunications with said remote access terminal means;

(f) reentering said identification code into said remote access terminal means; and (g) obtaining a second validation of said identification code from said central processing unit.

* * * * *